T. E. MURRAY, Jr., AND J. B. MURRAY.
METHOD OF ELECTRICAL WELDING.
APPLICATION FILED MAY 21, 1919.

1,316,383.

Patented Sept. 16, 1919.

Inventors
Thomas E. Murray Jr.
Joseph B. Murray

By Their Attorney

UNITED STATES PATENT OFFICE.

THOMAS E. MURRAY, JR., AND JOSEPH B. MURRAY, OF BROOKLYN, NEW YORK.

METHOD OF ELECTRICAL WELDING.

1,316,383.  Specification of Letters Patent.  Patented Sept. 16, 1919.

Application filed May 21, 1919. Serial No. 298,746.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Electrical Welding, of which the following is a specification.

The invention is a method of electrically welding a metal inner tube within an outer metal envelop, such as an inclosing tube, and a product of said method. There are many cases in the arts where it is desirable to secure one tube within such an envelop—as, for example, when the inner tube is a bushing or lining, or when two elongated tubes are to be united, the inner tube then entering for a predetermined distance into its envelop, or when the outer tube is a socket receiving the inner tube. The specific problem here solved is to accomplish this union by a single electrical welding operation, and in such a way as that the peripheral surface of the inner tube inclosed by the outer envelop will be welded to said envelop and so firmly and immovably fixed therein.

In the accompanying drawings—

Figure 1:
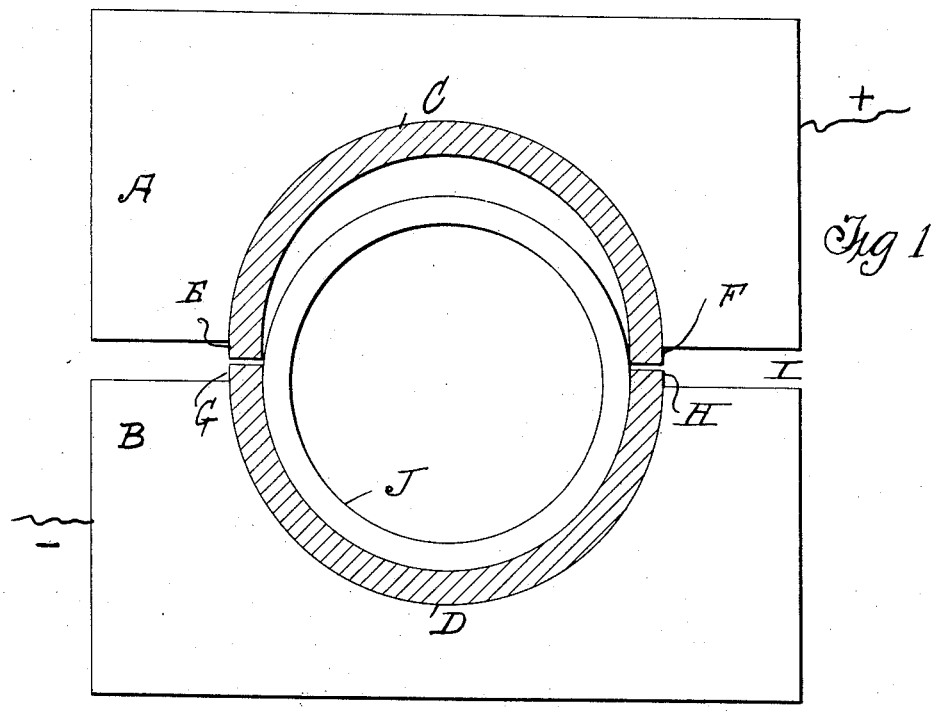
Figure 2:
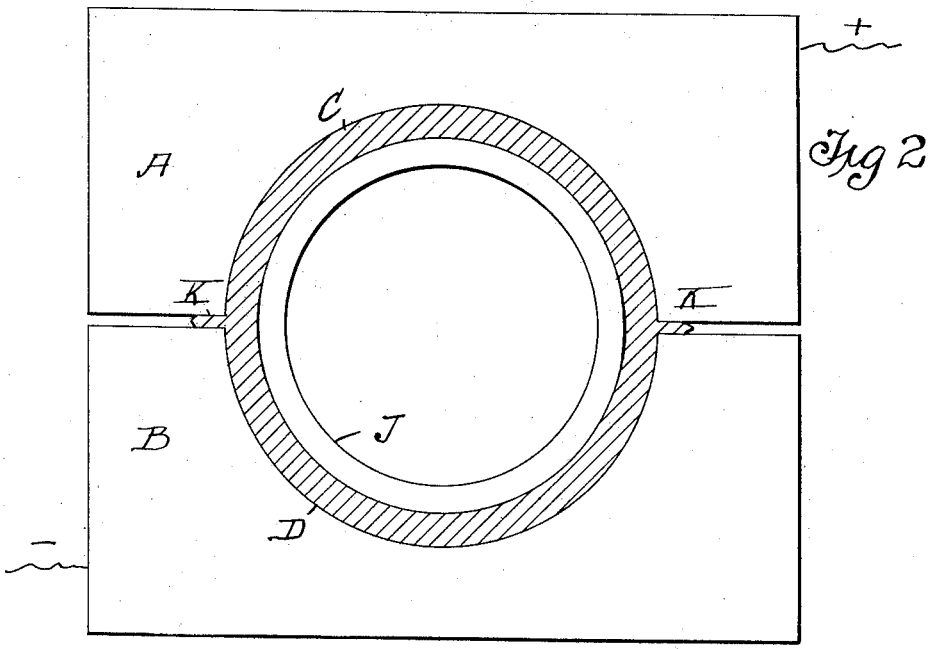

Figure 1 is an end view of the welding electrodes, the inner tube and an outer inclosing tube, the said outer tube being shown in cross section and the parts being represented in position before welding. Fig. 2 is a similar view, showing the parts after welding.

Similar letters of reference indicate like parts.

A and B are the welding electrodes, movable with respect to one another by any suitable means, not shown, whereby pressure is exerted upon the joint during the welding operation. The outer inclosing tube is formed in two longitudinal half sections C, D, preferably produced by striking up the metal, which are respectively seated in correspondingly formed longitudinal recesses in said electrodes. Integrally formed with the sections C, D are take-ups E, F on section C, and G, H on section D. When the sections C, D are seated in the recesses of electrodes A, B and before the welding operation is begun, said take-ups extend into the space I between said electrodes and register, as shown in Fig. 1. After the section D is seated in the electrode B, the tube J to be secured within the tube formed by sections C, D is placed in the section D, the electrode A being sufficiently elevated to permit of its introduction, and the section C is placed in the recess of said electrode A wherein it may be retained by its own resiliency. The electrode A is then forced downwardly, bringing the edges of the take-ups into contact, and the welding current is established, whereby the take-ups become melted while pressed together and the fused metal is partly extruded into the space between the electrodes, forming the fins K which may be afterward cut off, and partly caused to run into the joint between tube J and sections C, D, where on cooling it firmly unites the inclosed peripheral surface of said tube to said sections. When the welding is completed, the two sections C, D unitedly form a complete tube of circular cross section, with which the tube J is concentric.

We claim:

1. The method of uniting a metal inner tube to a metal outer envelop inclosing the same, which consists in electrically fusing under pressure a portion of the metal of said envelop and thereby causing said fused metal to enter the joint between the opposite surfaces of said tube and said envelop and unite said surfaces.

2. The method of completing a metal outer envelop and of uniting an inner inclosed tube thereto by a single electrical welding operation, which consists in disposing two longitudinal sections of said envelop in welding electrodes, placing said inner tube within said sections, establishing the welding current and pressing said electrodes together to cause said sections to become welded to one another and to said inner tube.

3. The method of uniting a metal inner tube to a metal outer envelop inclosing the same by a single electrical welding operation, which consists in placing said inner tube in two longitudinal half sections of said outer envelop disposed with their edges in registry and electrically welding said edges together and simultaneously causing the fused metal to enter the joint between the opposite surfaces of said tube and said envelop and unite said surfaces.

4. The method of uniting a metal inner tube to a metal outer tube inclosing the same by a single electrical welding operation, which consists in placing said inner tube within two longitudinal half sections of said outer tube, each section having integral take-ups disposed in registry, and the said sections being seated in welding electrodes, then establishing the welding current and pressing said electrodes together until said take-ups are fused and the said sections welded to form a complete tube and said inner tube is seated in both of said sections and united by the fused metal of said take-ups entering the joint between the opposing surfaces of said inner and outer tubes.

5. The combination of a metal inner tube and a metal outer envelop inclosing the same, the opposing surfaces of said tube and said envelop being electrically welded together.

6. The combination of a metal inner tube and a metal outer envelop inclosing the same, the opposing surfaces of said tube and said envelop being electrically welded and united by the fused metal of said envelop.

In testimony whereof we have affixed our signatures in presence of two witnesses.

THOMAS E. MURRAY, Jr.
JOSEPH B. MURRAY.

Witnesses:
GERTRUDE T. PORTER,
MAY T. MCGARRY.